United States Patent
Liu et al.

(10) Patent No.: US 10,164,465 B2
(45) Date of Patent: Dec. 25, 2018

(54) TRANSFER SWITCHING EQUIPMENT

(71) Applicant: SCHNEIDER ELECTRIC INDUSTRIES, SAS, Rueil Malmaison (FR)

(72) Inventors: Zhenzhong Liu, Shanghai (CN); Xiaojing Zeng, Shanghai (CN); Bin Zhou, Shanghai (CN)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 84 days.

(21) Appl. No.: 15/358,373

(22) Filed: Nov. 22, 2016

(65) Prior Publication Data
US 2017/0149274 A1    May 25, 2017

(30) Foreign Application Priority Data
Nov. 24, 2015   (CN) .......................... 2015 1 0825592

(51) Int. Cl.
*H01H 9/26* (2006.01)
*H02J 9/06* (2006.01)
*H01H 3/32* (2006.01)
*H01H 9/00* (2006.01)

(52) U.S. Cl.
CPC ............... *H02J 9/061* (2013.01); *H01H 3/32* (2013.01); *H01H 9/26* (2013.01); *H01H 2009/0088* (2013.01); *H01H 2300/018* (2013.01)

(58) Field of Classification Search
CPC ............... H01H 9/26; H01H 2300/018; H01H 71/1018; H01H 2221/052; H01H 71/0271; H01H 13/52; H01H 2009/265; H01H 25/008

USPC .......... 200/10, 9, 1 R, 1 V, 18, 50.32, 50.33, 200/50.37; 307/64, 112, 113
See application file for complete search history.

(56) References Cited

U.S. PATENT DOCUMENTS

| | | |
|---|---|---|
| 3,936,782 A | 2/1976 | Moakler et al. |
| 4,021,678 A | 5/1977 | Moakler et al. |
| 4,849,590 A | 7/1989 | Becker et al. |
| 5,070,252 A | 12/1991 | Castenschiold et al. |
| 6,849,811 B1 | 2/2005 | Heflin et al. |

FOREIGN PATENT DOCUMENTS

EP    2892068 A1    7/2015

OTHER PUBLICATIONS

Extended European Search Report for EP Application No. 16306545.1, dated Feb. 24, 2017, 10 pages.

*Primary Examiner* — Ahmed Saeed
(74) *Attorney, Agent, or Firm* — Locke Lord LLP

(57) ABSTRACT

The present disclosure provides a transfer switching equipment, comprising a first switch set and a second switch set. The transfer switching equipment is configured in a way that during the switching from a closed state of one of the first switch set and the second switch set to a closed state of the other of the first switch set and the second switch set, there is a state in which the neutral poles of the first switch set and the neutral pole of the second switch set are closed at the same time while all phase poles of the first switch set and all phase poles of the second switch set are all opened. The transfer switching equipment has a simple and reliable structure and occupies a small space and can provide continuous voltage with high-quality during switching the power supply.

13 Claims, 5 Drawing Sheets

TRANSFER SWITCHING EQUIPMENT

FIELD OF THE INVENTION

Embodiments of the present disclosure relate to transfer switching equipment (TSE).

BACKGROUND OF THE INVENTION

At some particularly important power distribution sites, usually a transfer switching equipment (TSE) is used in combination with an Uninterrupted Power Supply (UPS) to ensure uninterrupted power supply. The transfer switching equipment is connected to mains supply and a generator (or another mains supply), and its load end is connected to a working load via the UPS to supply power to the working load. In the case that one mains supply is normal, the mains supply is communicated with the UPS to supply power to the load through the mains supply. When the mains supply fails, the transfer switching equipment is switched to disconnect from the mains supply and communicates the generator or another mains supply with the UPS so that the generator or said another mains supply continues to supply power to the load. During transfer of the transfer switching equipment, the UPS continues to supply power to the load by virtue of electrical energy stored therein and thereby ensure uninterruption of the power supply.

A neutral pole and a phase pole in an ordinary transfer switching equipment usually have the same structure, so during the switching of the power supply, opening and closing operations of the neutral pole and phase pole are performed completely simultaneously. As such, during switching, during a time period after the neural pole of the first power supply is disconnected from the neutral pole of the UPS until the neutral pole of the second power supply is connected to the neutral pole of the UPS, the neutral pole of the UPS is temporarily disconnected from the neutral pole of the power supply. The temporary disconnection of the neutral pole will cause a change of potential of the UPS neutral pole relative to the ground, usually up to tens of volts. This will cause adverse influence or loss to a part of electrical equipment. For example, in an application in which a combination of a transfer switching equipment and an uninterrupted power supply is used to provide uninterrupted power supply to a data center, the temporary disconnection of the neutral pole causes zero to earth voltage of the uninterrupted power supply to rise and causes restart of the server, and this will cause serious consequences such as data loss and even damages of the server.

At present, there exists a transfer switching equipment, wherein during the switching, there is a period of overlapping time in which the neutral pole of the mains supply and the neutral pole of the generator or another mains supply are closed at the same time to communicate with the neutral pole of the UPS at the same time. However, this kind of transfer switching equipment still has a conspicuous drawback. First, during the switching of the transfer switching equipment, there is a period of overlapping time in which a phase pole of one power supply (e.g., one mains supply) and the neural pole of another power supply (e.g., another mains supply) are closed at the same time, which exerts an adverse influence on the voltage on the load, e.g., generate burrs in the voltage waveform. Furthermore, this kind of transfer switching equipment is complicated in structure, very large is product size, and is not conducive to installation and the saving of space.

SUMMARY OF THE INVENTION

An object of the present invention is to provide a transfer switching equipment to solve the above problems.

According to an embodiment of the present disclosure, there is provided a transfer switching equipment, comprising: a first switch set for connecting a first power supply to a load, comprising a neutral pole and at least one phase pole, wherein the neutral pole and each of said at least one phase pole of the first switch set respectively comprise a movable contact and a stationary contact, and the neutral pole of the first switch set comprises a first locking mechanism and a first linkage member; a second switch set for connecting a second power supply to the load, comprising a neutral pole and at least one phase pole, wherein the neutral pole and each of said at least one phase pole of the second switch set respectively comprise a movable contact and a stationary contact, and the neutral pole of the second switch set comprises a second locking mechanism and a second linkage member. The transfer switching equipment is configured in a way that with aid of the first locking mechanism, the second locking mechanism, the first linkage member and the second linkage member, during the switching from a closed state of one of the first switch set and the second switch set to a closed state of the other of the first switch set and the second switch set, there is a state in which the neutral pole of the first switch set and the neutral pole of the second switch set are closed at the same time while all phase poles of the first switch set and all phase poles of the second switch set are all opened.

According to an embodiment of the present disclosure, the transfer switching equipment further comprises a first drive mechanism which is configured to drive the movable contacts of the neutral pole and the phase pole of the first switch set to close and drive the movable contact of the phase pole of the first switch set to open; and a second drive mechanism which is configured to drive the movable contacts of the neutral pole and the phase pole of the second switch set to close and drive the movable contact of the phase pole of the second switch set to open.

According to an embodiment of the present disclosure, when the movable contact of the phase pole of the first switch set is closed, the first locking mechanism is at a locked position to lock the movable contact of the neutral pole of the first switch set to a closed position when the first drive mechanism drives the movable contact of the phase pole of the first switch set to open; when the movable contact of the phase pole of the second switch set is closed, the second locking mechanism is at a locked position to lock the movable contact of the neutral pole of the second switch set to a closed position when the second drive mechanism drives the movable contact of the phase pole of the second switch set to open; the first linkage member is configured to be driven by the second drive mechanism to release the locking of the first locking mechanism to the movable contact of the neutral pole of the first switch set so that the movable contact of the neutral pole of the first switch set is opened; the second linkage member is configured to be driven by the first drive mechanism to release the locking of the second locking mechanism to the movable contact of the neutral pole of the second switch set so that the movable contact of the neutral pole of the second switch set is opened.

According to an embodiment of the present disclosure, the first drive mechanism comprises a first drive shaft on which a first cam is fixedly disposed, rotation of the first cam driving the movable contact of the neutral pole of the first switch set to move to close; the second drive mechanism comprises a second drive shaft on which a second cam is fixedly disposed, rotation of the second cam driving the movable contact of the neutral pole of the second switch set to move to close.

According to an embodiment of the present disclosure, the first locking mechanism comprises: a first link rotatably arranged on the first drive shaft, and a first U-shaped link hinged between the first link and the movable contact of the neutral pole of the first switch set; the second locking mechanism comprises: a second link rotatably arranged on the second drive shaft, and a second U-shaped link hinged between the second link and the movable contact of the neutral pole of the second switch set; the first linkage member is hinged between the first locking mechanism and the second cam; and the second linkage member is hinged between the second locking mechanism and the first cam. The first U-shaped link has a first stop wall which is configured to block the pivoting of the first link relative to the first U-shaped link when the movable contact of the neutral pole of the first switch set is at the closed position and disengages with the first cam, and the second U-shaped link has a second stop wall which is configured to block the pivoting of the second link relative to the second U-shaped link when the movable contact of the neutral pole of the second switch set is at the closed position and disengages with the second cam.

According to an embodiment of the present disclosure, the first linkage member is hinged to any one of the first link, the first U-shaped link and a pivot between the first link and the first U-shaped link, so that the first linkage member can be driven by rotation of the second cam to release the blocking exerted by the first stop wall to the pivoting of the first U-shaped link; the second linkage member is hinged to any one of the second link, the second U-shaped link and a pivot between the second link and the second U-shaped link, so that the second linkage member can be driven by rotation of the first cam to release the blocking exerted by the second stop wall to the pivoting of the second U-shaped link.

According to an embodiment of the present disclosure, the first linkage member and the second linkage member are a pull rod, belt, cord or chain, which, by providing a pull force respectively to the first locking mechanism and the second locking mechanism, release the blocking of the first stop wall to the pivoting of the first U-shaped link and the blocking of the second stop wall to the pivoting of the second U-shaped link.

According to an embodiment of the present disclosure, the first linkage member and the second linkage member are push rods which, by providing a push force respectively to the first locking mechanism and the second locking mechanism, release the blocking of the first stop wall to the pivoting of the first U-shaped link and the blocking of the second stop wall to the pivoting of the second U-shaped link.

According to an embodiment of the present disclosure, the transfer switching equipment further comprises a first stabilizing spring connected to the first locking mechanism which is configured to preload for the first locking mechanism to make it remain stable when at the locked position; and a second stabilizing spring connected to the second locking mechanism which is configured to preload for the second locking mechanism to make it remain stable when at the locked position.

According to an embodiment of the present disclosure, the first linkage member is engaged with the second cam or the first locking mechanism via a pin and a slot so that after the second cam rotates to a position enabling the movable contact of the neutral pole of the second switch set to close, further rotation of the second cam drives the first linkage member to move to release the first locking mechanism from its locked position; and the second linkage member is engaged with the first cam or the second locking mechanism via a pin and a slot so that after the first cam rotates to a position enabling the movable contact of the neutral pole of the first switch set to close, further rotation of the first cam drives the second linkage member to move to release the second locking mechanism from its locked position.

According to an embodiment of the present disclosure, the first drive shaft is configured to rotate to a position enabling the movable contact of the phase pole of the first switch set to close, only after rotating to a position enabling the first cam to drive the movable contact of the neutral pole of the first switch set to close; and the second drive shaft is configured to rotate to a position enabling the movable contact of the phase pole of the second switch set to close, only after rotating to a position enabling the second cam to drive the movable contact of the neutral pole of the second switch set to close.

According to an embodiment of the present disclosure, the transfer switching equipment further comprises a first return spring configured to drive the first drive mechanism to drive the movable contact of the neutral pole of the first switch set to open, after the first drive mechanism drives the movable contact of the phase pole of the first switch set to open and the first locking mechanism is released from the locked position; and a second return spring configured to drive the second drive mechanism to drive the movable contact of the neutral pole of the second switch set to open, after the second drive mechanism drives the movable contact of the phase pole of the second switch set to open and after the second locking mechanism is released from the locked position.

According to an embodiment of the present disclosure, the movable contact of the neutral pole of the first switch set is provided with a first roller to engage with the first cam; the movable contact of the neutral pole of the second switch set is provided with a second roller to engage with the second cam.

The transfer switching equipment according to embodiments of the present disclosure has a simple and reliable structure and occupies a small space. By employing linkage between the two switch sets, the transfer switching equipment ensures there is an ideal state in which neutral poles of the two switch sets are both closed while all phase poles of the two switch sets are opened during the switching of power supplies, thereby ensuring that there are no obvious fluctuations and burrs of the voltage on the load during the switching. Hence, the transfer switching equipment according to embodiments of the present disclosure can provide continuous voltage with high-quality during the switching of the power supply, which is particularly advantageous for some special occasions using electrical power such as data storage.

BRIEF DESCRIPTION OF DRAWINGS

The above and other objectives and properties of the present disclosure will be made more apparent in combination with the following detailed description of the figures, wherein.

Throughout the above figures, the same reference signs will be understood as designating the same, like or corresponding features or functions.

DETAILED DESCRIPTION OF PREFERRED EMBODIMENTS

Now reference is made to embodiments of the present disclosure. One or more examples of embodiments are shown in figures. Embodiments are provided by illustrations of the present disclosure, and are not intended to limit the present disclosure. For example, features shown or described as a portion of an embodiment might be used in another embodiment to generate further embodiments. The present disclosure is intended to include these and other modification and variations falling within the scope and spirit of the present disclosure.

Figure 1:
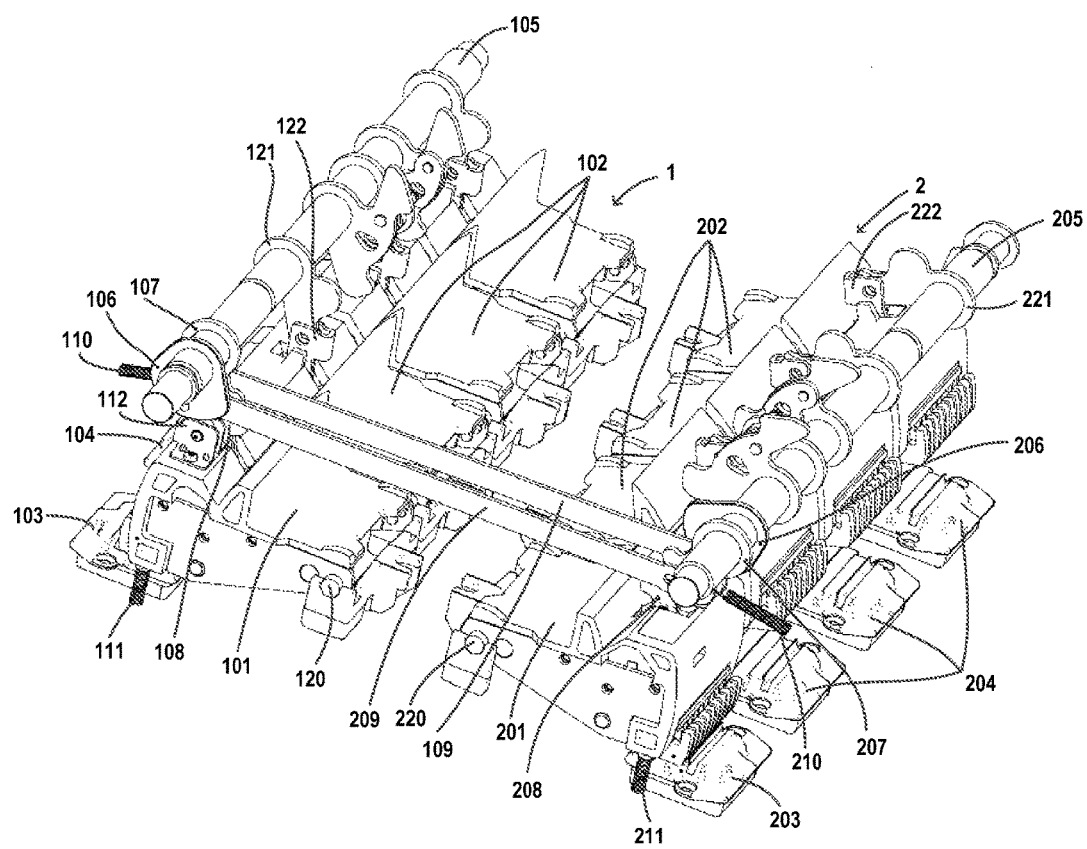
FIG. 1 is a perspective view of a transfer switching equipment according to an embodiment of the present disclosure.

FIG. 1 is a perspective view of a transfer switching equipment according to an embodiment of the present disclosure. The transfer switching equipment comprises a first switch set 1 and a second switch set 2 which are disposed symmetrically about an axis. The first switch set 1 is used to connect a first power supply to an uninterrupted power supply (UPS), and comprises a neutral pole and three phase poles, wherein the neutral pole of the first switch set comprises a movable contact 101 and a stationary contact 103, and each phase also comprises a movable contact 102 and a stationary contact 104. The second switch set 2 is used to connect a second power supply to the uninterrupted power supply, and comprises a neutral pole and three phase poles, wherein the neutral pole of the second switch set comprises a movable contact 201 and a stationary contact 203, and each phase also comprises a movable contact 202 and a stationary contact 204. The corresponding moveable contacts of the first switch set 1 and second switch set 2 are at equal potential, and jointly electrically connected to corresponding poles of the uninterrupted power supply connected by the transfer switching equipment. For example, the movable contacts 101 and 201 of the neutral poles of the first switch set 1 and second switch set 2 are both electrically connected to the neutral pole of the uninterrupted power supply, and movable contacts 102 and 202 of each phase pole of the first switch set 1 and second switch set 2 are both electrically connected to respective phase poles of the uninterrupted power supply. Stationary contacts 103 and 104 of the first switch set 1 are respectively electrically connected to corresponding poles of the first power supply, and stationary contacts 203 and 204 of the second switch set 2 are respectively electrically connected to corresponding poles of the second power supply. Although FIG. 1 shows that the first switch set 1 and second switch set 2 respectively have three phase poles, but the present invention is not limited to the embodiment with three phase poles, and embodiments according to the present invention are applicable to circumstances with more than three phase poles (e.g., four phase poles) or less than three phase poles (e.g., only one phase).

The first power supply and second power supply may be any power supplies which are different from each other. For example, the first power supply may be a mains supply, and the second power supply may be a generator or another mains supply, or vice versa. Input terminals of the uninterrupted power supply (UPS) are respectively connected to each movable contact of the first switch set 1 and each movable contact of the second switch set 2 of the transfer switching equipment, and its output terminal is connected to a working load (namely, an electrical equipment). In a normal case, the first power supply or second power supply supplies power to the working load via the UPS. In the event of failure of one power supply, one switch set in the transfer switching equipment needs to be opened and the other switch set needs to be closed to switch to the other power supply to supply power to the working load. During switching, a power supply (e.g., a battery) carried by the UPS supplies power to the working load during instant power failure generated upon switching, to ensure continuous power supply to the working load. As far as the transfer switch equipment to be described in detail herein, during switching of the transfer switching equipment, the uninterrupted power supply (UPS) is always connected in series between the transfer switching equipment and the input end of the uninterrupted power supply (UPS), and does not affect the switching of the transfer switching equipment in the text herein. Hence, to facilitate description, in the text below, the uninterrupted power supply (UPS) and the working load connected in series therewith are together taken as the load of the transfer switching equipment, which is electrically connected to the respective movable contacts of the first switch set 1 and second switch set 2 of the transfer switching equipment.

One end of each movable contact in the first switch set 1 and second switch set 2 is pivotally connected to a pivot 120, 220 located on a base (not shown) so as to be driven by a driving mechanism to rotate about the pivot to enable the other end of the movable contact to connect to or disconnect from a corresponding stationary contact, so that one of the first power supply and second power supply selectively turns on electrical connection with the load and the other of the first power supply and second power supply turns off electrical connection with the load to implement the switching of the power supply. Return springs 111 and 211 are respectively disposed between movable contacts 102 and 202 of the neural poles of the switch sets and the base so that in special cases a return force of the return spring drives the movable contacts 102 and 202 of the neutral poles away from corresponding stationary contacts by a sufficient distance to achieve a safe anti-breakdown distance to implement safe and reliable disconnection, which will be described in detail later.

There are further provided a first drive shaft 105 and a second drive shaft 205 to respectively drive the movable contacts of the first switch set 1 and second switch set 2 to take action. The first drive shaft 105 is fixedly provided with a number of drive arms 121 corresponding to the number of the phase poles, one end of the drive arm 121 is hinged with one end of a driving link 122, and the driving link 122 is then hinged with a corresponding phase pole movable contact 102. When the first drive shaft 105 is driven by an actuation means (e.g., motor) to rotate in a clockwise direction as seen in FIG. 1, the first drive shaft 105 brings a linkage mechanism formed by the drive arms 121, the driving link 122 and the movable contacts 102 to act to enable the movable contacts 102 to rotate downwardly about the pivot 120 to contact with the corresponding phase pole stationary contacts 104, thereby communicating the phase pole of the load with the phase pole of the first power supply. When the first drive shaft 105 rotates reversely (e.g., rotates in a counter-clockwise direction), the first drive shaft 105 will bring the linkage mechanism formed by the drive arm 121, the driving link 122 and movable contact 102 to act reversely to lift the movable contact 102 of each of the phase poles out of contact with corresponding stationary contacts 104 and out of electrical connection. The mechanisms of the three phase poles in the first switch set 1 for driving the movable contact are completely the same, namely, have the same drive arm 121 and driving link 122. Furthermore, the actions of the movable contacts 102 of the three phase poles are completely synchronous along with rotation of the first drive shaft 105, thereby achieving simultaneous closing and opening.

Likewise, the second drive shaft 205 is fixedly provided with a number of drive arms 221 corresponding to the number of the phase poles, one end of the drive arm 221 is hinged with one end of a driving link 222, and the driving link 222 is then hinged with a corresponding phase pole movable contact 202. When the second drive shaft 205 is driven by an actuation means (e.g., a motor) to rotate in a counterclockwise direction as seen in FIG. 1, the second drive shaft 205 brings a linkage mechanism formed by the drive arms 221, the driving link 222 and the movable contact 202 to act to enable the movable contacts 202 to rotate downwardly about the pivot 220 to contact with the corresponding phase pole stationary contacts 204, thereby communicating the phase poles of the load with the phase poles of the second power supply. When the second drive shaft 205 rotates reversely (e.g., rotates in a clockwise direction), the second drive shaft 205 will bring the linkage mechanism formed by the drive arm 221, the driving link 222 and movable contacts 202 to act reversely to lift the movable contact 202 of each of the phase poles out of contact with corresponding stationary contact 204 and out of electrical connection. The mechanisms of the three phase poles in the second switch set 2 for driving movable contact are completely the same, namely, have the same drive arm 221 and driving link 222. Furthermore, the actions of the movable contacts 202 of the three phase poles are completely synchronous along with rotation of the second drive shaft 205, thereby achieving simultaneous closing and opening.

To make voltage on the load remain stable when the transfer switching equipment switches between the first power supply and the second power supply, it is desirable to achieve an ideal state that neutral poles of the two switch sets are both closed at the same time during switching while all phase poles of the two switch sets are opened at this time. To this end, a driving manner independent from the phase pole movable contact is provided for the movable contacts 101 and 201 of the neutral poles of the first switch set 1 and second switch set 2, to achieve a special action time sequence different from the phase pole movable contacts, as described in detail below.

A first cam 106 is fixedly disposed on the first drive shaft 105 at a position corresponding to the neutral pole movable contact 101. When the first drive shaft 105 rotates in a clockwise direction, the first cam 106 rotates along with the first drive shaft 105 so as to contact a top surface of the movable contact 101 and press down the movable contact 101 when its portion with a larger radius moves towards the movable contact 101, so that the movable contact 101 of the neutral pole is in contact and closure with the corresponding stationary contact 103. Likewise, a second cam 206 is fixedly disposed on the second drive shaft 205 at a position corresponding to the neutral pole movable contact 201. When the second drive shaft 205 rotates in a counterclockwise direction, the second cam 206 rotates along with the second drive shaft 205 so as to contact a top surface of the movable contact 201 and press down the movable contact 201 when its portion with a larger radius moves towards the movable contact 201, so that the movable contact 201 of the neutral pole is in contact and closure with the corresponding stationary contact 203.

A first roller 112 and a second roller (not shown) are disposed respectively on the movable contacts 101 and 201 respectively at positions in contact with cams 106 and 206 to, upon contacting with the corresponding cam, achieve rolling contact and prevent the cam from being jammed by the movable contact so that it cannot continue to rotate to a closed position.

Although the first cam 106 for driving the movable contact 101 of the neutral pole and the drive arm 121 for driving the movable contact 102 of the phase pole are both driven by the same first drive shaft 105, the first cam 106 and drive arm 121 fixed on the first drive shaft 105 need to be accurately positioned with respect to a circumferential angle of the first drive shaft 105, to ensure that only after rotating to a position enabling the first cam 106 to drive the movable contact 101 of the neutral pole of the first switch set 1 to be closed, the first drive shaft 105 rotates to a position enabling the drive arm 121 to drive the movable contact 102 of the phase pole of the first switch set 1 to be closed. As such, it is ensured that in each switching action, the neutral pole in the first switch set 1 to be closed is closed prior to the phase pole to avoid the case that the phase pole of one switch set is also closed when the neutral poles of the two switch sets are closed overlappingly. Likewise, the second cam 206 and drive arm 221 fixed on the second drive shaft 205 need to be accurately positioned with respect to a circumferential angle of the second drive shaft 205, to ensure that only after rotating to a position enabling the second cam 206 to drive the movable contact 201 of the neutral pole of the second switch set 2 to be closed, the second drive shaft 205 rotates to a position enabling the drive arm 221 to drive the movable contact 202 of the phase pole of the second switch set 2 to be closed. As such, it is ensured that in each switching action, the neutral pole in the second switch set 2 to be closed is closed prior to the phase pole.

To allow the neutral poles of the two switch sets during switching to have an overlapping closure time, when the first drive shaft 105 and second drive shaft 205 rotate reversely relative to a rotation direction of the closure movement to open respective phase pole movable contacts, it is desirable that the movable contact of the neutral pole corresponding to the drive shaft rotating reversely does not open along with the reverse rotation of the drive shaft, but remains the closed state and wait to open upon the movable contact of the neutral pole of the other switch set also entering the closed state. To this end, a first locking mechanism and a second locking mechanism are respectively provided for the movable contacts of the neutral poles of the first switch set 1 and second switch set 2.

Figure 2:
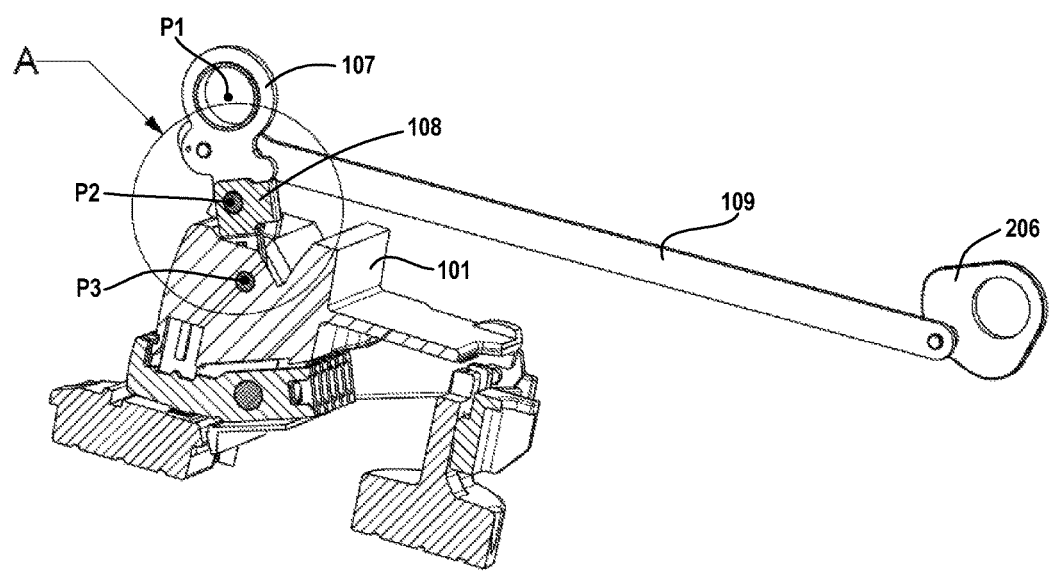
FIG. 2 shows a locking mechanism of a first switch set 1 in FIG. 1 in a locked state.
Figure 3:
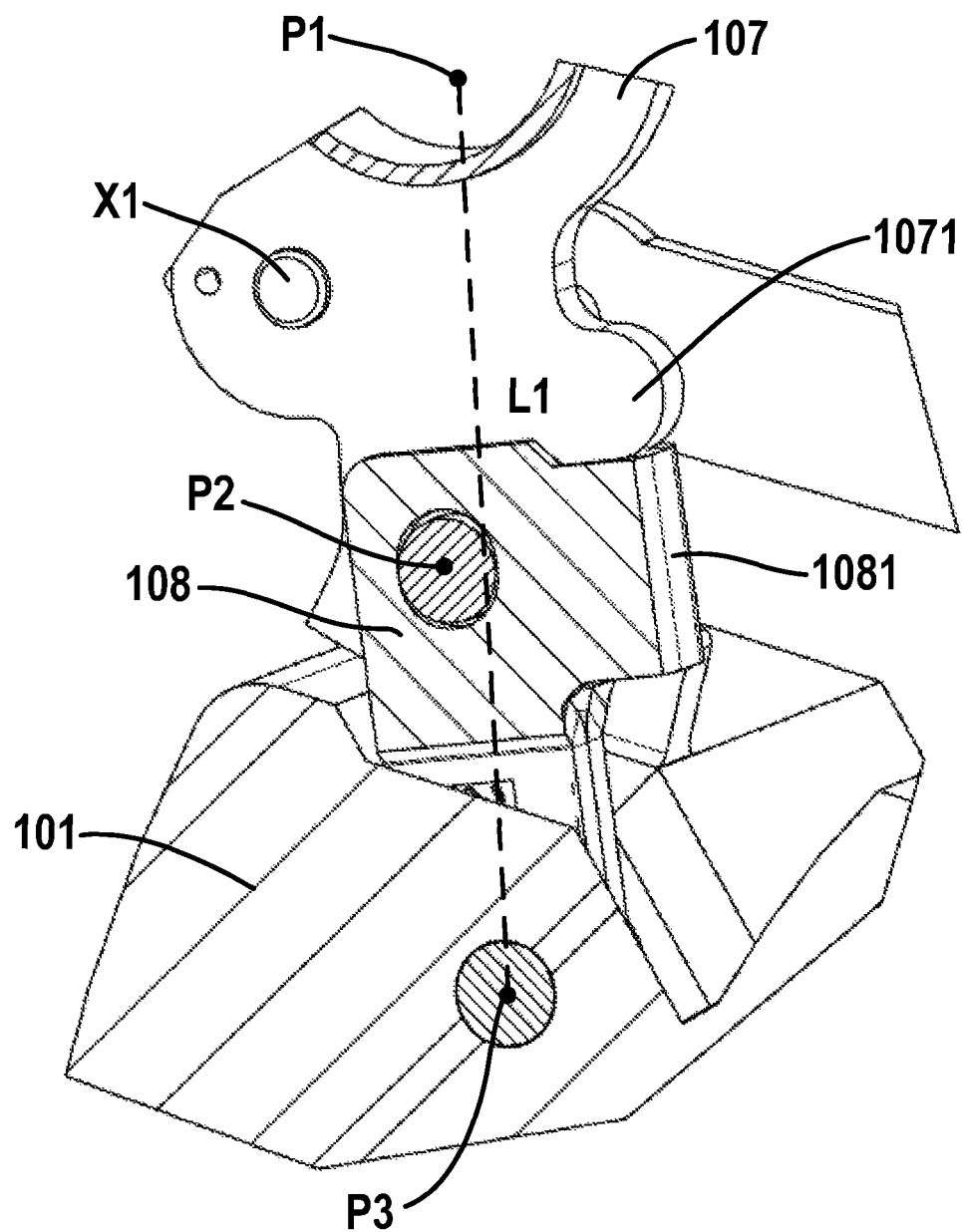
FIG. 3 is a partial enlarged view of location A of FIG. 2.

As shown in FIGS. 1-3, the first locking mechanism comprises a first link 107 rotatably arranged on the first drive shaft 105, and a first U-shaped link 108 hinged between the first link 107 and the movable contact 101 of the neutral pole of the first switch set 1. The cross section of the first U-shaped link 108 is U-shaped, and the first U-shaped link 108 has a first stop wall 1081 on a side adjacent to a center of the two switch sets. One end of the first link 107 extends into the U-shaped space of the first U-shaped link 108 and is hinged therewith. When the first drive shaft 105 rotates the cam 106 in a clockwise direction to make the movable contact 101 of the neutral pole press down and gets closed, the first link 107 and the first U-shaped link 108 are pulled down to a dead point position of the linkage mechanism formed by the first drive shaft 105, the first link 107, the first U-shaped link 108 and the movable contact 101, or a position slightly going beyond the dead point (position as shown in FIGS. 2-3). At the dead point position, a pivot point P1 between the first drive shaft 105 and the first link 107, a pivot point P2 between the first link 107 and the first U-shaped link 108 and a pivot point P3 between the first U-shaped link 108 and the movable contact 101 are all located on the same straight line.

When the first drive shaft 105 rotates reversely to drive the movable contacts 102 of the phase poles to disconnect from the stationary contacts 104 and meanwhile bring the first cam 106 to rotate counterclockwise so that the first cam 106 is disengaged from the movable contact 101 (or the first roller 112 thereon), even if the movable contact 101 no longer receives a pressure applied by the first cam 106 and further receives the return force of the return spring 111, if at the dead point position, the return force of the return spring 111 cannot enable the first U-shaped link 108 to pivot relative to the first link 107 and the movable contact 101 so that a distance between the movable contact 101 and the first drive shaft 105 cannot change, so the movable contact 101 of the neutral pole is locked at the closed position and cannot be lifted. As such, the movable contact 101 of the neutral pole does not disconnect along with the disconnection of the phase pole movable contact 102, and instead it is locked by the first locking mechanism to its closed position.

Due to errors caused by manufacturing precision and fitting precision, in a practical product, when the movable contact of the neutral pole is at the closed position, it might be difficult for the above linkage mechanism to exactly reach a theoretical dead point position. Even though it exactly reaches the dead point position, it might deviate away from the dead point position due to mechanical vibration and thus cannot lock the movable contact 101 at the closed position. To this end, favorably, in an embodiment, the linkage mechanism is arranged to slightly go beyond the dead point position when the movable contact 101 of the neutral pole is at the closed position. That is, in the linkage mechanism shown in FIG. 3, components move in a way that the pivot point P2 between the first link 107 and the first U-shaped link 108 is located slightly on the left side of a connection line L1 of the pivot point P1 and pivot point P3 (the side opposite to the first stop wall 1081). At this position, a protrusion 1071 on the first link 107 abuts against the first stop wall 1081 on the first U-shaped link 108 so that the first U-shaped link 108 cannot continue to pivot relative to the first link 107 in the counterclockwise direction as seen in FIG. 3. In this state, even if the first cam 106 no longer presses down the movable contact 101 and the first return spring 111 applies the return force to the movable contact 101, since the pivot point P2 goes beyond the dead point and is located on the left side of the connection line L1, the return force of the first return spring 111 can only provide a torque in the counterclockwise direction of FIG. 3 to the first U-shaped link 108 via the movable contact 101. However, mutual abutting of the protrusion 1071 on the first link 107 and the first stop wall 1081 on the first U-shaped link 108 further blocks the pivot of the first U-shaped link 108 in the counterclockwise direction. As a result, the return force of the return spring 111 cannot enable the first U-shaped link 108 to pivot relative to the first link 107 and the movable contact 101, so that the distance between the movable contact 101 and the first drive shaft 105 cannot change and therefore the movable contact 101 of the neutral pole is also locked at the closed position and cannot be lifted. As such, the movable contact 101 of the neutral pole does not disconnect along with the disconnection of the phase pole movable contact 102, and instead it is locked by the first locking mechanism to its closed position.

The locked position is arranged to slightly go beyond the dead point so that it is unnecessary to impose the rigid requirement that the linkage mechanism is right at an absolute dead point when the movable contact 101 is closed, and meanwhile so that stability and reliability of the locking mechanism is improved. To further improve stability and reliability of the locking structure, in an embodiment, there is further provided a first stabilizing spring 110 connected to the first locking mechanism. The first stabilizing spring 110 is connected between the base and the first locking mechanism, for example connected to the first link 107, connected to the first U-shaped link 108 or connected to the pivot between the two, so that when the movable contact 101 of the neutral pole is at the closed position and meanwhile the first locking mechanism is at the locked position, the first stabilizing spring 110 applies a pre-tension load towards the left side of the connection line L1 to the first locking mechanism such that its pivot point P2 is stabilized on the left side of the connection line L1, thereby enabling the first locking mechanism to be stabilized at the locked position without causing the pivot point P2, due to a slight external force, to go beyond the dead point again and deviate to the right side of the connection line L1 and release the locking accidentally.

After the movable contact 101 of the neutral pole of the first switch set 1 is locked at the closed position, the movable contact 201 of the neutral pole of the second switch set 2 begins to be closed. After the movable contacts of the neutral poles of the first switch set 1 and second switch set 2 are both closed to achieve an overlapped closed state, the movable contact 101 of the neutral pole of the first switch set 1 needs to be disconnected to facilitate the closure of the phase pole of the second switch set 2. A first linkage member 109 is provided to enable the movable contact 101 of the neutral pole of the first switch set 1 to be unlocked and disconnected at this time. The first linkage member 109 is hinged between the first locking mechanism and the second cam 206 so that with the driving of the second drive shaft 205 via the second cam 206, the first linkage member 109 releases the lock of the first locking mechanism to the movable contact 101 of the neutral pole of the first switch set 1.

Figure 4:
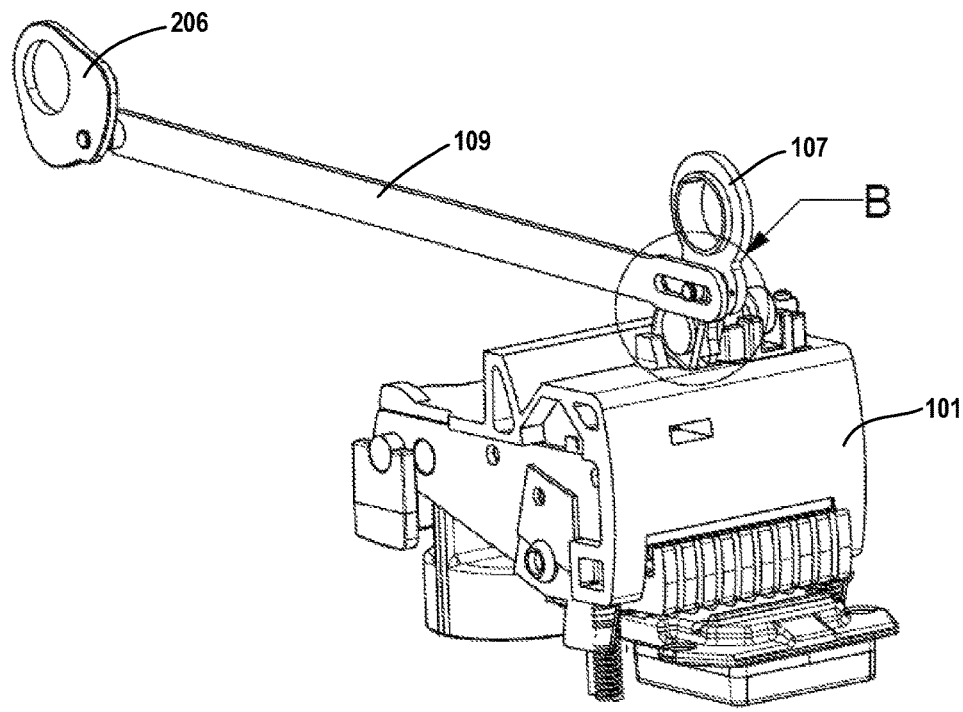
FIG. 4 shows the structure in FIG. 2 from another side.
Figure 5:
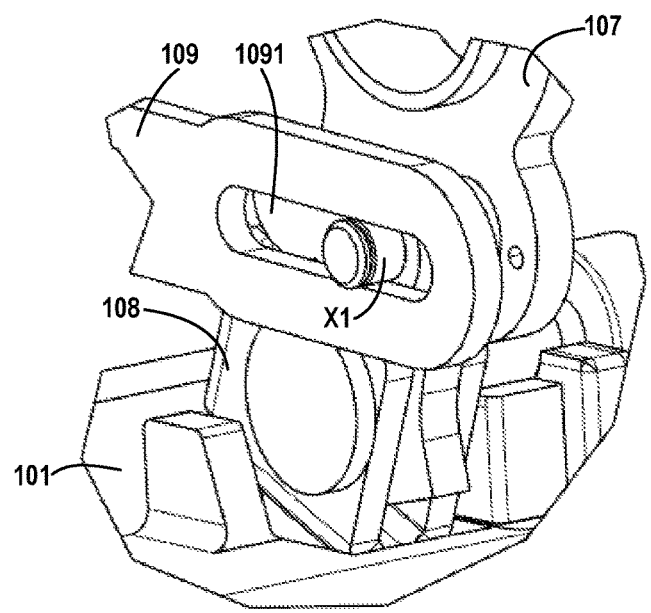
FIG. 5 is a partial enlarged view of location B in FIG. 4.

As shown in FIGS. 4-5, the first linkage member 109 is a link, one end of which is hinged to the second cam 206 and the other end of which has a long slotted hole 1091 extending in an axial direction of the first linkage member 109. A pin X1 on the first link 107 extends into the long slotted hole 1091 and makes pin-slot engagement with it, so that the pin X1 may displace in the long slotted hole 1091 in the axial direction of the first linkage member 109 relative to the first linkage member 109.

Figure 6:
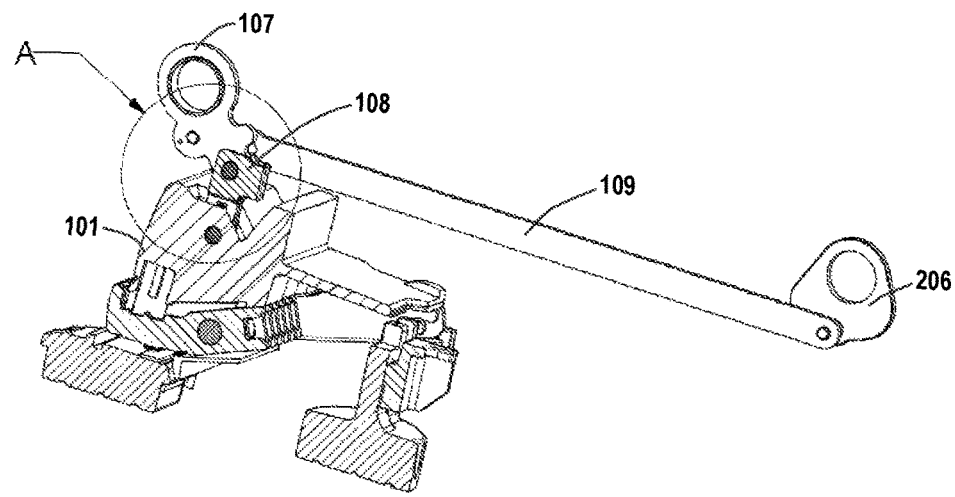
FIG. 6 shows a locking mechanism of a first switch set 1 in FIG. 1 in an unlocked state.

While the second drive shaft 205 rotates in the counterclockwise direction in FIG. 1 to drive the second cam 206 to rotate in the counterclockwise direction to make the movable contact 201 of the neutral pole of the second switch set 2 closed, although rotation of the second cam 206 pulls the first linkage member 109 hinged thereto to move towards the second cam 206, since a distal end of the long slotted hole 1091 at the other end of the first linkage member 109 does not contact the pin X1 yet (see FIG. 5), at this time the first linkage member 109 can displace relative to the pin X1 while the pin X1 and the first link 107 and the first U-shaped link 108 connected thereto still remain at the original position and still in the locked position so that the movable contact 101 of the neutral pole of the first switch set still remains at the closed position. After the second drive shaft 205 continues to rotate in the counterclockwise direction as seen in FIG. 1 to drive the second cam 206 to rotate in the counterclockwise direction to make the movable contact 201 of the neutral pole of the second switch set 2 complete the closure, the distal end of the long slotted hole 1091 on the first linkage member 109 has already moved to a position where it is in contact with the pin X1. Hence, when the second drive shaft 205 continues to rotate and drive the second cam 206, the second cam 206 continues to pull the first linkage member 109 to move, causing that the first linkage member 109 begins to pull the pin X1 to move towards the second cam 206 (the rightward direction shown in FIGS. 1 and 6). The pull tends to cause the first link 107 to pivot relative to the first U-shaped link 108 in the counterclockwise direction in FIG. 7. Since the first cam 106 no longer presses the movable contact 101 at this time, and in the pivoting direction the first stop wall 1081 does not block the pivoting of the first link 107 relative to the first U-shaped link 108, the first linkage member 109 may smoothly pull the first link 107 to continue to pivot and enable the pivot point P2 to go beyond the dead point again and return to an unstable position on the right side of the connection line L1 to release the locking. Relative pivoting of the first link 107 and the first U-shaped link 108 causes the distance between the pivot points P1 and P3 to reduce. Since the position of the pivot point P1 is fixed relative to the base, the locking mechanism will pull up the movable contact 101 to be out contact of the corresponding stationary contact 103.

Figure 7:
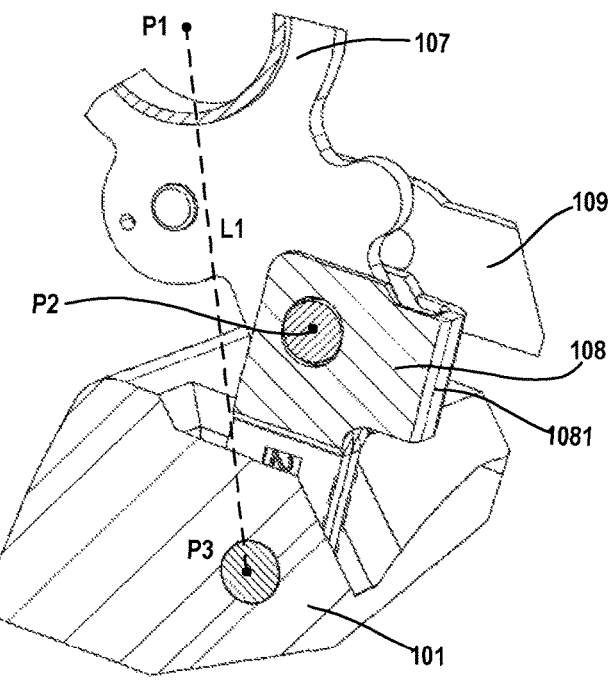
FIG. 7 is a partial enlarged view of location A in FIG. 6.

After the pivot point P2 goes beyond the dead point again and returns to an unstable position on the right side of the connection line L1, the return force applied by the first return spring 111 to the movable contact 101 will generate a torque in the clockwise direction of FIG. 7 to the first U-shaped link 108. The clockwise torque will make the first U-shaped link 108 further pivot relative to the first link 107 in the clockwise direction, thereby assisting the movable contact 101 of the neutral pole of the first switch set 1 in rising to disconnect from the corresponding stationary contact 103. In a state that the movable contact 101 of the neutral pole is disconnected from the stationary contact 103, the first return spring 111 further ensures the two keep a sufficient safe distance.

The second locking mechanism for the movable contact 201 of the neutral pole of the second switch set 2 has a construction similar to the first locking mechanism, i.e., including a second link 207 rotatably disposed on the second drive shaft 205, and a second U-shaped link 208 (see FIG. 1) hinged between the second link 207 and the movable contact 201 of the neutral pole of the second switch set 2. The principle of the second locking mechanism locking the movable contact 201 of the neutral pole of the second switch set 2 is identical with the principle of the first locking mechanism locking the movable contact 101 of the neutral pole of the first switch set 12, and therefore is not detailed here. However, it needs to be appreciated that since the rotation direction of the second drive shaft 205 driving the movable contact of the second switch set 2 to close during the closure movement is opposite to the rotation direction of the first drive shaft 105 during driving the movable contact of the first switch set 1 to close, when the second locking mechanism is at the locked position, its corresponding position beyond the dead point should be on a side opposite to the position where the first locking mechanism goes beyond the dead point. Hence, a second stop wall 2081 on the second U-shaped link 208 of the second locking mechanism should also be located at a side opposite to the first stop wall 1081 on the first U-shaped link 208, and a protrusion on the second link 207 for abutting against the second stop wall 2081 for limiting rotation of the second U-shaped link 208 should also be located on a side opposite to the protrusion on the first link 107. That is to say, constructions of the first locking mechanism and second locking mechanism are mirrored to each other about a centerline between the first switch set 1 and second switch set 2.

The timing of the second locking mechanism locking the movable contact 201 is similar to the first locking mechanism. That is, after the second drive shaft 205 rotates to drive the second cam 206 to press the movable contact 201 of the neutral pole of the second switch set 2 to the closed position, the second locking mechanism enters the locked state. Likewise, a second stabilizing spring 210 is connected between the second locking mechanism and the base to pre-load the second locking mechanism to make it remain stable when it is at the locked position.

A second linkage member 209 is provided to enable the movable contact 201 of the neutral pole of the second switch set 2 to be smoothly disconnected after experiencing an overlapping time period in which it is closed simultaneously with the movable contact 101 of the neutral pole of the first switch set 1, and to facilitate the closure of the phase pole of the first switch set 1. The second linkage member 209 is hinged between the second locking mechanism and the first cam 106 so that with the driving of the first drive shaft 105 via the first cam 106, the second linkage member 209 releases the locking of the second locking mechanism to the movable contact 201 of the neutral pole of the second switch set 2. The second linkage member 209 and its construction of connecting with the second locking mechanism are similar to the first linkage member 109 and its construction of connecting with the first locking mechanism. That is, the second linkage member 209 may also be a link, one end of which is hinged to the first cam 106 and the other end of which has a long slotted hole extending in an axial direction of the second linkage member 209. A pin on the second link 207 extends into the long slotted hole and makes pin-slot engagement with it, so that the pin may displace in the long slotted hole in the axial direction of the second linkage member 209 relative to the second linkage member 209.

While the first drive shaft 105 rotates in the clockwise direction in FIG. 1 to drive the first cam 106 to rotate in the clockwise direction to make the movable contact 101 of the neutral pole of the first switch set 1 closed, since a distal end of the long slotted hole at one end of the second linkage member 209 has not contacted the pin on the second link 207 yet, at this time the second linkage member 209 does not bring the pin on the second link 207 and the second link 207 and the second U-shaped link 208 connected thereto to move, the movable contact 201 of the neutral pole of the second switch set still remains at the closed position. After the first drive shaft 105 continues to rotate in the clockwise direction in FIG. 1 to drive the first cam 106 to rotate in the clockwise direction to make the movable contact 101 of the neutral pole of the first switch set 1 complete the closure, the distal end of the long slotted hole on the second linkage member 209 has already moved to a position in which it is in contact with the pin. Hence, when the first drive shaft 105 continues to rotate and drive the first cam 106, the first cam 106 continues to pull the second linkage member 209 to move, causing that the second linkage member 209 begins to pull the pin on the second link 207 to move towards the first cam 106 (the leftward direction shown in FIG. 1). The pull causes the pin and the pivot point of the second link 207 connected thereto relative to the second U-shaped link 208 to go beyond the dead point position and move to one side adjacent to the center of the two switch sets. As such, the second locking mechanism moves to the unstable position and thereby implements unlocking of the movable contact 201. At this time, the movable contact 201 of the neutral pole of the second switch set 2 can, under joint action of the second linkage member 209 and the second return spring 211, rise and disconnect from the corresponding stationary contact 203.

In an embodiment, connection between the linkage members and corresponding locking mechanisms may be implemented in other manners. For example, positions of the above pin and corresponding long slotted holes are interchangeable. Furthermore, the pin or long slotted hole engaged with the linkage members may be disposed on other components of the corresponding locking mechanism, for example, disposed on each U-shaped link or disposed on a pivot between the first/second links and the first/second U-shaped links, which can also achieve an effect of pulling the pivot point between the first/second links and the first/second U-shaped links to an unlocked position which is beyond the dead point. Furthermore, alternatively, the pin-slot engagement structure may also be disposed at an end of each linkage member in which the linkage member is hinged with the corresponding cam, and the end of each linkage member in which the linkage member is connected with the corresponding locking mechanism is directly connected with the pivot. This can also achieve an action sequence of enabling the corresponding cam to drive the corresponding movable contact to close first and then enabling the linkage member to pull the locking mechanism of the other switch set to the unlocked position.

The design of the above-mentioned first drive shaft 105 and second drive shaft 205 only takes into account the closing and opening sequence of the neutral pole and phase pole in the same switch set; the design of the above-mentioned first linkage member 109 and second linkage member 209 only takes into account an action sequence between the closing of the neutral pole of one switch set and the opening of the neutral pole of the other switch set. While with aid of the first and second linkage members, a closing movement of one switch set drives an opening movement of the neutral pole of the other switch set, what also needs to be taken into account is the action sequence between the phase pole of the switch set which is closing and the neutral pole of the switch set to be opened. To avoid existence of the closure of the phase pole of any switch set during the overlapping time period in which the neutral poles of the two switch sets are both closed (which otherwise may cause unstabability of the load voltage waveform), it is necessary to open the neutral pole of the switch set to be opened first, and then close the phase pole of the switch set to be closed. To this end, regarding the first switch set 1, the first cam 106 on the first drive shaft 105 should be staggered from the drive arm 121 for the phase pole a sufficient circumferential phase such that along with the rotation of the first drive shaft 105, after the first cam 106 drives the movable contact 101 of the neural pole to close and after the second linkage member 209 drives the movable contact 201 of the neutral pole of the second switch set 2 to open, the first drive shaft 105 drives each phase pole 102 to close via the drive arm 121. Likewise, regarding the second switch set 2, the second cam 206 on the second drive shaft 205 should be staggered from the drive arm 221 for the phase pole a sufficient circumferential phase such that along with the rotation of the second drive shaft 205, after the second cam 206 starts to drive the movable contact 201 of the neural pole to close and after the first linkage member 109 drives the movable contact 101 of the neutral pole of the first switch set 1 to open, the second drive shaft 205 starts to drive each phase pole 202 to close via the drive arm 221.

In the embodiments illustrated above, both the first linkage member 109 and second linkage member 209 serve as a pull rod to provide a pull force to the second locking mechanism and the first locking mechanism for unlocking. However, the pull force may be provided via other structures in place of the pull rod. For example, the first linkage member 109 and second linkage member 209 may also be a cord, belt or chain or the like.

An operation sequence of respective movable contacts when the above-described transfer switching equipment switches power supply will be described as follows. It is assumed that an initial state is that all movable contacts of the first switch set 1 are closed so that currently the first power supply is communicated with the load, whereas all movable contacts of the second switch set 2 are opened so that the second power supply is disconnected from the load. When the first power supply fails and the first power supply needs to be disconnected from the load and the second power supply needs to be communicated with the load, the switching procedure begins (which for example may be triggered by a control circuit).

First, the first drive shaft 105 is driven to rotate to enable all movable contacts 102 of all phase poles of the first switch set 1 to be opened simultaneously. At this time, the first cam 106 is disconnected from the movable contact 101 of the neutral pole, but the movable contact 101 of the neutral pole of the first switch set 1, being locked by the first locking mechanism, still remains at the closed position. During this process, due to the pin-slot engagement between the first cam 106 and the second linkage member 209 or the pin-slot engagement between the second linkage member 209 and the second locking mechanism, rotation of the first cam 106 does not cause the locking mechanism or movable contact of the second switch set 2 to act.

Then, rotation of the second drive shaft 205 rotates and first, via the second cam 206, drives the movable contact 201 of the neutral pole of the second switch set 2 to close. In this procedure, due to the pin-slot engagement between the second cam 206 and the first linkage member 109 or the pin-slot engagement between the first linkage member 109 and the first locking mechanism, rotation of the second cam 206 does not cause the locking mechanism or movable contact 101 of the first switch set 1 to act. At this time, the neutral poles of the two switch sets achieve a state of closing at the same time, and the phase pole of the first switch set has already been opened and the phase pole of the second switch set 2 has not yet been closed, thereby achieving an ideal switching state.

After the movable contact 201 is closed, the second drive shaft 205 continues to rotate, and, via the second cam 206 and the first linkage member 109, pulls the first locking mechanism to release the locking to the movable contact 101 such that the movable contact 101 of the neutral pole of the first switch set 1 is opened. At this time, all movable contacts of the first switch set 1 are all opened such that the first switch set 1 completes the procedure of disconnecting the first power supply from the load.

Then the second drive shaft 205 continues to rotate, and via the drive arm 221, drives all phase pole movable contacts 202 of the second switch set 2 to close simultaneously. At this time, all movable contacts of the second switch set 2 are all closed such that the second switch set completes the procedure of communicating the second power supply with the load. As such, the whole power supply switching procedure is completed.

When it is needed to switch from the second power supply to the first power supply, the action sequence of the first switch set 1 and second switch set 2 exchanges with the above-mentioned action sequence of switching from the first power supply to the second power supply, that is, the first switch set 1 executes the previous action sequence of the second switch set 2 while the second switch set 2 executes the previous action sequence of the first switch set 1, thus completing switching from the second power supply to the first power supply, and meanwhile still ensuring there is an ideal state in which neutral poles of the two switch sets to close at the same time while all phase poles of the two switch sets are all opened.

It may be envisioned that a pushing force may be provided to the second locking mechanism and first locking mechanism through the first linkage member 109 and second linkage member 209 to release the locking, whereupon the first linkage member 109 and second linkage member 209 are push rods. In the case of using the pushing force to unlock the second locking mechanism and first locking mechanism, when the second locking mechanism and first locking mechanism are at the locked position, positions of their first/second links and first/second U-shaped links slightly beyond the dead point should be opposite to the case of using the pull force to unlock, such that they, being applied with the pushing force, reversely go beyond the dead point to reach the unstable unlocked position. In this case, the positions of the first/second stop walls on the first/second U-shaped links should also be opposite to the case of using the pull force to unlock, and meanwhile, the positions of the protrusions of the first/second links should also be opposite to the case of using the pull force to unlock.

It should be appreciated that the above embodiments illustrate the principle of the present invention, but is not intended to limit the scope of the present invention; and it should be appreciated by those skilled in the art that medications and variations may be adopted without departing from the spirit and scope of the present invention. These modifications and variations are considered in the scope of the present invention and the appended claims. The protection scope of the present invention is defined by the appended claims. In addition, any reference sign in claims should not be construed as limiting the claims. Use of the verb "comprise" and its variants do not exclude existence of elements or steps besides those recited in claims. The indefinite article "a" or "an" preceding an element or step does not exclude existence of a plurality of such elements.

What is claimed is:

1. A transfer switching equipment, comprising:
a first switch set for connecting a first power supply to a load, comprising a neutral pole and at least one phase pole, wherein the neutral pole and each of said at least one phase pole of the first switch set respectively comprise a movable contact and a stationary contact, and the neutral pole of the first switch set comprises a first locking mechanism and a first linkage member;
a second switch set for connecting a second power supply to the load, comprising a neutral pole and at least one phase pole, wherein the neutral pole and each of said at least one phase pole of the second switch set respectively comprise a movable contact and a stationary contact, and the neutral pole of the second switch set comprises a second locking mechanism and a second linkage member; and
characterized in that the transfer switching equipment is configured in a way that with aid of the first locking mechanism, the second locking mechanism, the first linkage member and the second linkage member, during the switching from a closed state of one of the switch set and the second switch set to a closed state of the other of the first switch set and the second switch set, there is a state in which the neutral pole of the first switch set and the neutral pole of the second switch set are closed at the same time while all phase poles of the first switch set and all phase poles of the second switch set are all opened;
further comprising a first drive mechanism and a second drive mechanism, wherein the first drive mechanism comprises a first drive shaft, and the second drive mechanism comprises a second drive shaft;
wherein, the first locking mechanism comprises: a first link rotatably arranged on the first drive shaft, and a first U-shaped link hinged between the first link and the movable contact of the neutral pole of the first switch set;
the second locking mechanism comprises: a second link rotatably arranged on the second drive shaft, and a second U-shaped link hinged between the second link and the movable contact of the neutral pole of the second switch set.

2. The transfer switching equipment according to claim 1, wherein the first drive mechanism is configured to drive the movable contacts of the neutral pole and the phase pole of the first switch set to close and drive the movable contact of the phase pole of the first switch set to open; and the second drive mechanism is configured to drive the movable contacts of the neutral pole and the phase pole of the second switch set to close and drive the movable contact of the phase pole of the second switch set to open.

3. The transfer switching equipment according to claim 2, wherein,
when the movable contact of the phase pole of the first switch set is closed, the first locking mechanism is at a locked position to lock the movable contact of the neutral pole of the first switch set to a closed position when the first drive mechanism drives the movable contact of the phase pole of the first switch set to open;
when the movable contact of the phase pole of the second switch set is closed, the second locking mechanism is at a locked position to lock the movable contact of the neutral pole of the second switch set to a closed position when the second drive mechanism drives the movable contact of the phase pole of the second switch set to open;
the first linkage member is configured to be driven by the second drive mechanism to release the locking of the first locking mechanism to the movable contact of the neutral pole of the first switch set so that the movable contact of the neutral pole of the first switch set is opened; and
the second linkage member is configured to be driven by the first drive mechanism to release the locking of the second locking mechanism to the movable contact of the neutral pole of the second switch set so that the movable contact of the neutral pole of the second switch set is opened.

4. The transfer switching equipment according to claim 3, wherein, a first cam is fixedly disposed on the first drive shaft, rotation of the first cam driving the movable contact of the neutral pole of the first switch set to move to close; a second cam is fixedly disposed on the second drive shaft, rotation of the second cam driving the movable contact of the neutral pole of the second switch set to move to close.

5. The transfer switching equipment according to claim 4, wherein,
the first linkage member is hinged between the first locking mechanism and the second cam; and
the second linkage member is hinged between the second locking mechanism and the first cam;
wherein the first U-shaped link has a first stop wall which is configured to block the pivoting of the first link relative to the first U-shaped link when the movable contact of the neutral pole of the first switch set is at the closed position and disengages with the first cam, and the second U-shaped link has a second stop wall which is configured to block the pivoting of the second link relative to the second U-shaped link when the movable contact of the neutral pole of the second switch set is at the closed position and disengages with the second cam.

6. The transfer switching equipment according to claim 5, wherein, the first linkage member is hinged to any one of the first link, the first U-shaped link and a pivot between the first link and the first U-shaped link, so that the first linkage member can be driven by rotation of the second cam to release the blocking exerted by the first stop wall to the pivoting of the first U-shaped link;
the second linkage member is hinged to any one of the second link, the second U-shaped link and a pivot between the second link and the second U-shaped link, so that the second linkage member can be driven by rotation of the first cam to release the blocking exerted by the second stop wall to the pivoting of the second U-shaped link.

7. The transfer switching equipment according to claim 6, wherein, the first linkage member and the second linkage member are a pull rod, belt, cord or chain, which, by providing a pull force respectively to the first locking mechanism and the second locking mechanism, release the blocking of the first stop wall to the pivoting of the first U-shaped link and the blocking of the second stop wall to the pivoting of the second U-shaped link.

8. The transfer switching equipment according to claim 6, wherein, the first linkage member and the second linkage member are push rods which, by providing a push force respectively to the first locking mechanism and the second locking mechanism, release the blocking of the first stop wall to the pivoting of the first U-shaped link and the blocking of the second stop wall to the pivoting of the second U-shaped link.

9. The transfer switching equipment according to claim 3, wherein the transfer switching equipment further comprises a first stabilizing spring connected to the first locking mechanism which is configured to preload for the first locking mechanism to make it remain stable when at the locked position; and a second stabilizing spring connected to the second locking mechanism which is configured to preload for the second locking mechanism to make it remain stable when at the locked position.

10. The transfer switching equipment according to claim 4, wherein the first linkage member is engaged with the second cam or the first locking mechanism via a pin and a slot so that after the second cam rotates to a position enabling the movable contact of the neutral pole of the second switch set to close, further rotation of the second cam drives the first linkage member to move to release the first locking mechanism from its locked position; and the second linkage member is engaged with the first cam or the second locking mechanism via a pin and a slot so that after the first cam rotates to a position enabling the movable contact of the neutral pole of the first switch set to close, further rotation of the first cam drives the second linkage member to move to release the second locking mechanism from its locked position.

11. The transfer switching equipment according to claim 4, wherein the first drive shaft is configured to rotate to a position enabling the movable contact of the phase pole of the first switch set to close, only after rotating to a position enabling the first cam to drive the movable contact of the neutral pole of the first switch set to close; and the second drive shaft is configured to rotate to a position enabling the movable contact of the phase pole of the second switch set to close, only after rotating to a position enabling the second cam to drive the movable contact of the neutral pole of the second switch set to close.

12. The transfer switching equipment according to claim 3, wherein the transfer switching equipment further comprises a first return spring configured to drive the first drive mechanism to drive the movable contact of the neutral pole of the first switch set to open after the first drive mechanism drives the movable contact of the phase pole of the first switch set to open and the first locking mechanism is released from the locked position; and a second return spring configured to drive the second drive mechanism to drive the movable contact of the neutral pole of the second switch set to open after the second drive mechanism drives the movable contact of the phase pole of the second switch set to open and after the second locking mechanism is released from the locked position.

13. The transfer switching equipment according to claim 4, wherein the movable contact of the neutral pole of the first switch set is provided with a first roller to engage with the first cam; the movable contact of the neutral pole of the second switch set is provided with a second roller to engage with the second cam.

* * * * *